*INVENTOR.*
MELVIN E. TRIMBLE
BY John F. Lawler
ATTORNEY

INVENTOR.
MELVIN E. TRIMBLE
BY John F Lawler
ATTORNEY

United States Patent Office 3,384,887
Patented May 21, 1968

3,384,887
INTRUDER DETECTION SYSTEM

Melvin E. Trimble, Saratoga, Calif., assignor to Sylvania Electric Products Inc., a corporation of Delaware Filed Sept. 3, 1965, Ser. No. 484,958
12 Claims. (Cl. 340—258)

This invention relates to intruder detection systems and more particularly to an improved perimeter transmission line intruder detection system employing impedance control circuits for compensating for the effects that climatic changes have on the transmission lines.

Certain prior art perimeter intruder detection systems employ balanced pairs of transmission lines enclosing an area to be protected. Receivers monitor signals representing changes of characteristics of the transmission lines for determining and indicating intrusion of the protected area. When the transmission lines are balanced such that the resistive and reactive components of their effective characteristic impedances have constant nominal values, signals having values less than a predetermined level are processed by the receiver so that no alarm is given. When the transmission lines are unbalanced, such as by an increase or decrease in the resistive and/or reactive component of their characteristic impedances caused by an intruder adjacent a transmission line, signals indicating a discontinuity on the transmission line and possible intrusion of the protected area are processed by the receiver and result in the giving of an alarm.

In outdoor applications, the transmission lines are exposed to the elements and are therefore subject to changes in climatic conditions, such as rain and snow. For example, snow under or over a transmission line may cause either a resistive, a reactive, or a complex change in the characteristic impedance of the transmission line. If the system employs a pair of symmetrically balanced transmission lines and snow build-up associated with each line is the same, the discontinuities caused by the snow cancel. In many applications, however, the transmission lines are spaced apart so that snow slowly builds up unevenly at different places under one or more transmission lines. Thus, variations of the characteristic impedances caused by the snow do not cancel and signals representing these changes are applied to the receiver. In order to properly compensate for such slow impedance changes, the magnitude and sense of the change in their resistive and reactive components must be determined.

A primary object of this invention therefore is the provision of impedance control circuits that automatically compensate for slow changes in the characteristic impedances of transmission lines.

Another object is the provision of impedance control circuits that automatically compensate for slow changes in both the resistive and reactive components of the characteristic impedances of transmission lines that are caused by an uneven build-up of snow at different places under one or more transmission lines.

In accordance with this invention, these and other objects thereof are accomplished by connecting a variable resistive element and a variable reactive element to a transmission line and modulating the values thereof in order to modulate the associated resistive and reactive components of the effective characteristic impedance of the transmission line about nominal values. As snow builds up under a transmission line, the nominal values of the resistive and/or reactive components of the effective characteristic impedance required to balance the transmission lines slowly change. Signals reflected from the transmission line are synchronously detected as a function of the modulation signal to provide error signals that bias the variable impedance elements to have the requisite values to change the resistive and reactive components to the nominal values required to rebalance the transmission lines. The phase relationship of the reflected signal and the modulation signal determines the sense of the change in the value of the variable impedance elements required to balance the transmission lines. The magnitude of the outputs of the synchronous detectors determines the amount of change in the values of the variable impedance elements required to balance the transmission line. The outputs of the detectors are summed by integrators having long time constants to insure that the respective variable impedance elements are responsive only to very slow changes in the characteristic impedances of the transmission lines.

This invention and these and other objects thereof will be more fully understood from the following description of a preferred embodiment thereof together with the accompanying drawings in which.

Figure 1:
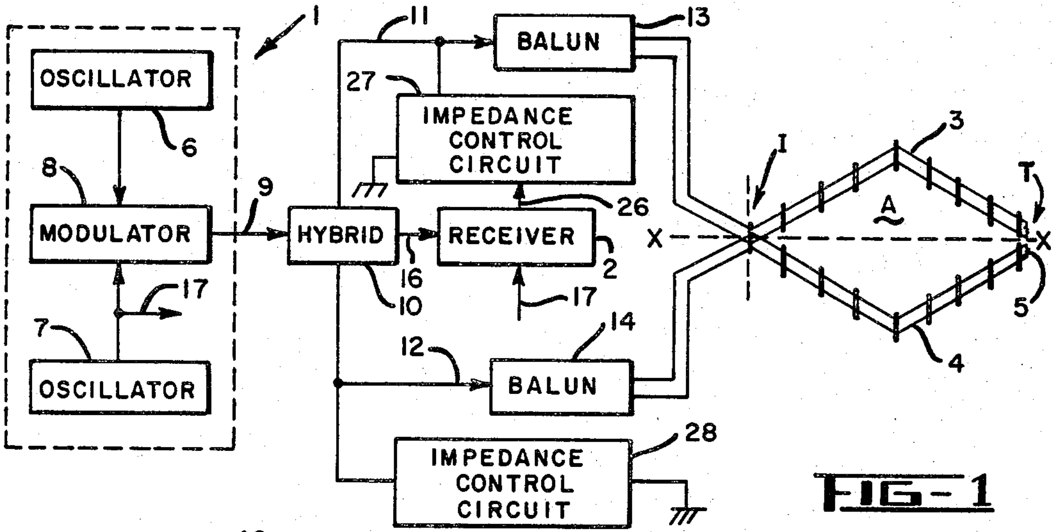
FIGURE 1 is a schematic and block diagram of a balanced transmission line intruder detection system incorporating this invention.

Referring to FIGURE 1, an intruder detection system in which this invention may be employed comprises a transmitter 1, a receiver 2 and a pair of two-wire transmission lines 3 and 4 which enclose an area A to be protected. This intruder detection system is described in detail in a copending application of Trimble et al., Ser. No. 466,612, filed June 24, 1965. The transmission lines extend between inputs at I and terminations at T and are symmetrical about a vertical plane containing the axis X—X which extends through the input and terminations. The conductors of the transmission lines are preferably supported by posts spaced a quarter wavelength apart at the center of the transmitter operating frequency and are symmetrically located with respect to the inputs at I. Each transmission line is terminated at T by an impedance 5 having a value substantially equal to the characteristic impedance of the associated transmission line.

Transmitter 1 comprises continuous wave radio frequency oscillators 6 and 7 and a modulator 8. The output of oscillator 6 may be a 30 mHz. sinusoidal signal that is modulated at a 1 kHz. rate by the sinusoidal output of oscillator 7. The output of modulator 8 is applied on line 9 to hybrid signal branching network 10. The lines, including line 9, which connect components of the system preferably are coaxial transmission lines. Since the outer conductors of these coaxial transmission lines are connected to a ground reference potential they are omitted from the drawings for simplicity of illustration and only the center conductors are shown. The outputs of hybrid 10 on lines 11 and 12 are coupled through baluns 13 and 14 to two-wire transmission lines 3 and 4, respectively. Baluns 13 and 14 provide the proper impedance transformation between the associated hybrid and transmission lines.

Signals reflected from the transmission lines on lines 11 and 12 to hybrid 10 are coupled onto line 16 and are applied to receiver 2. The hybrid shifts the relative phase of the signals on lines 11 and 12 by 180 degrees. Thus, reflected signals on lines 11 and 12 that are of equal magnitude and phase cancel in the hybrid and no output is applied on line 16. A second input is applied on line 17 to the receiver from oscillator 7.

Figure 2:
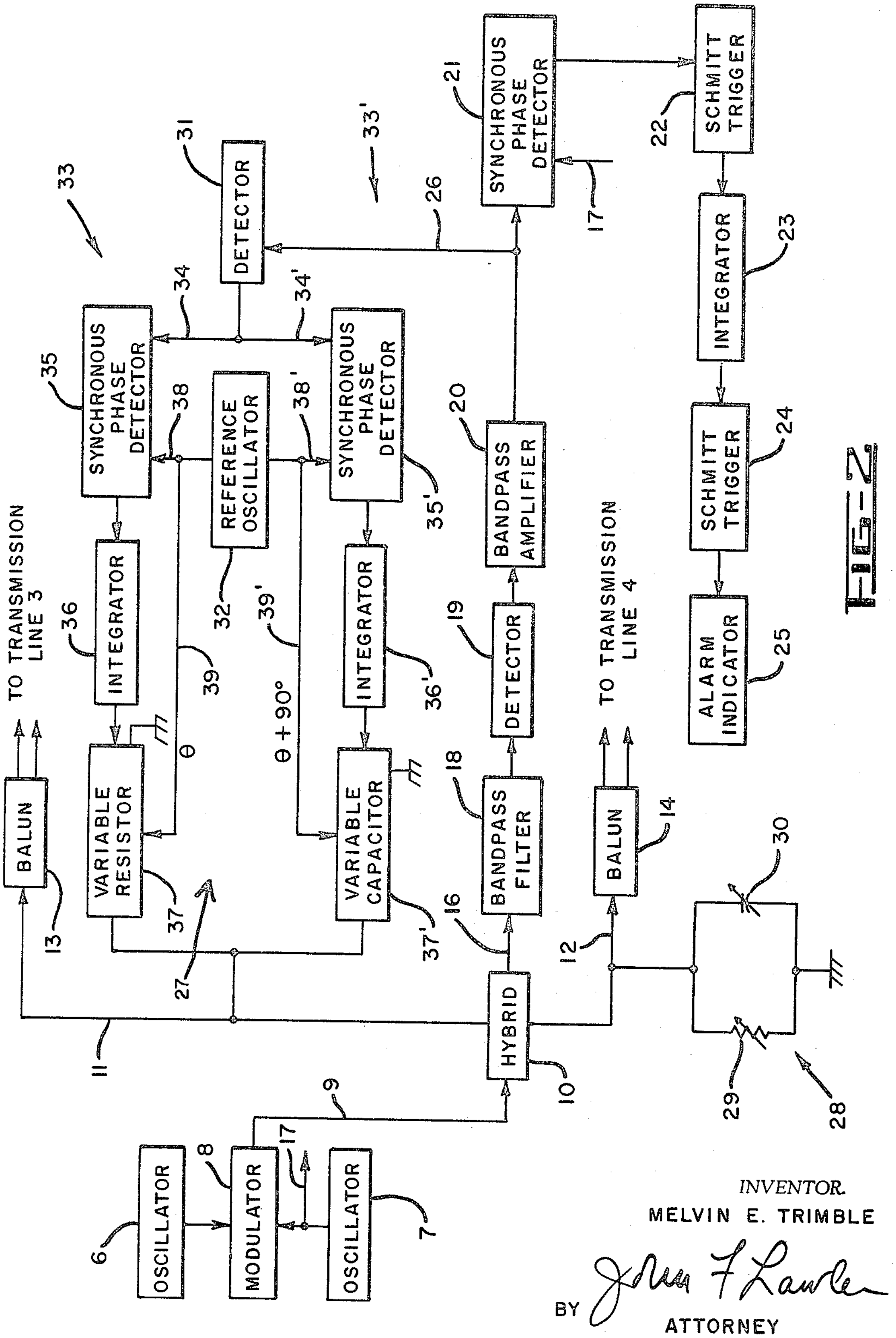
FIGURE 2 is a detailed schematic and block diagram of the system of FIGURE 1.

Referring to FIGURE 2, the output of hybrid 10 on line 16 is filtered by bandpass filter 18 and is rectified by detector 19 to provide a signal having a frequency equal to that of oscillator 7. The audio signal is amplified by bandpass amplifier 20 which is tuned to amplify the 1 kHz. modulation signal. The amplified signal is rectified by a synchronous detector 21. The 1 kHz. modulation signal from oscillator 7 is the reference signal applied on line 17 to the synchronous detector. The output of the synchronous detector is threshold detected by Schmitt trigger 22 and is summed by integrator 23. The signal stored by the integrator is monitored by a Schmitt trigger 24 which controls the operation of an alarm indicator 25.

In operation, the continuous wave radio frequency signal from oscillator 6 is modulated by the output of oscillator 7. The modulated signal on line 9 is divided by hybrid 10 and is applied to the two-wire lines 3 and 4 which define the perimeter of the protected area. Since each line is terminated in its characteristic impedance, the modulated RF signal is not reflected from the line terminations at T to the input at I and a signal is not applied on line 16 to the receiver. When an intruder approaches transmission line 3, however, the characteristic impedance of that line changes and presents a discontinuity which is transformed to and unbalances the hybrid. A portion of the incident RF signal also is reflected to hybrid 10 by the discontinuity. The output of the hybrid is processed by the receiver to determine and indicate intrusion of the protected area.

The intruder detection system described above does not per se constitute this invention.

Discontinuities, such as may be caused by snow, at certain positions on the transmission lines change the resistive component of the transmission line characteristic impedance and unbalance the transmission lines. A discontinuity located an eighth-wavelength away from one of these positions, however, changes the reactive component of the characteristic impedance. (These positions are effectively spaced a quarter wavelength apart since there is an eighth wavelength from a certain position to the associated other position and another eighth-wavelength from the other position back to the certain position.) A discontinuity located between one of these certain positions and an associated position changes both the resistive and reactive components of the characteristic impedance. This impedance change may be either an increase or decrease of either one or both components of the characteristic impedance.

In accordance with this invention, an output of receiver 2 (see FIGURE 1) is applied on line 26 to an impedance control circuit 27. The output of impedance control circuit 27 is connected through line 11 and balun 13 to transmission line 3. A second impedance control circuit 28 is connected through line 12 and balun 14 to transmission line 4. Impedance control circuit 28 comprises the parallel combination of variable resistor 29 and variable capacitor 30 electrically connected in parallel between transmission line 4 and ground.

Impedance control circuit 27 comprises a detector 31, a reference oscillator 32 and a pair of comparison circuits 33 and 33'. Oscillator 32 may generate a 10 Hz. sinusoidal signal. Detector 31 comprises a low pass filter for passing signals having a frequency of 10 Hz. The output of detector 31 is applied to comparison circuits 33 and 33' on lines 34 and 34', respectively.

Comparison circuit 33 comprises synchronous phase detector 35, integrator 36 and variable impedance 37. A first output of reference oscillator 32 is applied on line 38 to synchronous detector 35 and on line 39 to a second input to variable impedance 37. Comparison circuits 33 and 33' are similar, the components of circuit 33' being designated by primed reference characters. The distinction between the comparison circuits are that variable impedance 37 is a variable resistor whereas variable impedance 37' is a variable capacitor, and the outputs of reference oscillator 32 on lines 38, 39 and lines 38', 39' are 90 degrees out of phase. Comparison circuits 33 and 33' are responsive to reflected signals caused by changes in the resistive component and the reactive component, respectively, of the characteristic impedances of the transmission lines.

Figure 3:
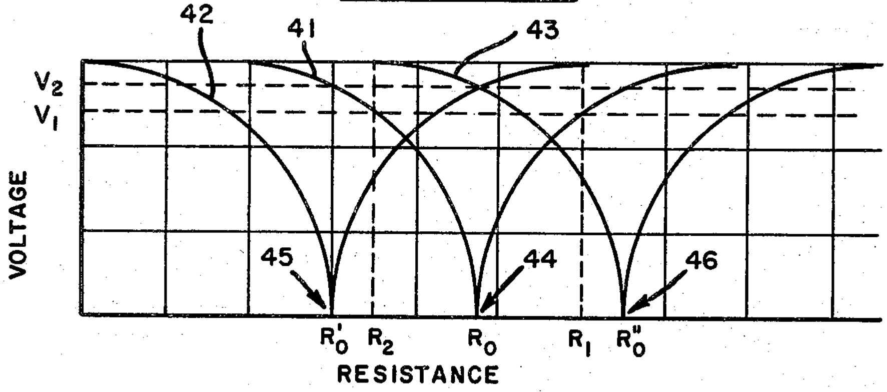
FIGURES 3 and 4 are waveforms illustrating the operation of this invention.

The waveforms of FIGURE 3 represent the response characteristic of the transmission lines under different environmental conditions as a function of values of variable resistor 37 (and thus as a function of values of the resistive component of the transmission line characteristic impedance). Waveforms (not shown) the same as the waveforms of FIGURE 3 illustrate the response characteristic of the transmission lines as a function of the reactance of variable capacitor 37' (and thus as a function of values of the reactive component of the transmission line characteristic impedance). Since comparison circuits 33 and 33' are the same except for the phase of the modulation signal on lines 38' and 39' from oscillator 32 only the operation of comparison circuit 33 is illustrated in the drawings and is described in detail.

Variable resistor 37 may be a grounded emitter transistor. The effective resistance of this transistor is a function of the collector current which is controlled by a base drive. Variable capacitor 37' may be a varactor diode. The outputs of variable impedances 37, 37' are connected through line 11 and balun 13 to transmission line 3.

Synchronous phase detectors 35, 35' may be of the type described on pages 78–81 of "Servomechanism Practice," by William R. Ahrendt, McGraw-Hill Book Co. Inc., 1954. The operation of detectors 35 and 35' are illustrated in Tables 1 and 2, respectively.

TABLE 1

| | Reference, ° | Input, ° | Output (Voltage) |
|---|---|---|---|
| a | 0 | 0 | − |
| b | 0 | +90 | 0 |
| c | 0 | +180 | + |
| d | 0 | +270 | 0 |

TABLE 2

| | Reference, ° | Input, ° | Output (Voltage) |
|---|---|---|---|
| a | 0+90 | 0 | 0 |
| b | 0+90 | +90 | − |
| c | 0+90 | +180 | 0 |
| d | 0+90 | +270 | + |

The phase of the reference signal on lines 38, 38' from reference oscillator 32 is represented in the first column, the phase of the rectified reflected signal applied to the synchronous detectors on lines 34, 34' is represented in the second column and the output of the synchronous detectors is represented in the last column.

Referring to Table 1 and synchronous detector 35, when the reference signal and the rectified reflected signal from detector 31 are 90 degrees out of phase (rows *b* and *d*) the output of detector 35 is zero. When the reference signal and the rectified reflected signal on line 34 are in phase (row *a*), the output of detector 35 is a negative voltage that is equal to the magnitude of the rectified reflected signal. Conversely, when the reference signal and the rectified signal are 180 degrees out of phase (row *c*), the output of detector 35 is a positive voltage that is equal to the magnitude of the rectified reflected signal. When the phase difference between the reference signal and the rectified reflected signal are between the values shown in the tables, the change in the effective characteristic impedance is complex and the absolute value of the output of detector 35 is proportional to the phase difference between the reference signal and rectified reflected signal.

Integrators 36 and 36' have long time constants, on the order of 60 minutes, in order to sum only the slow changes in the characteristic impedance of the transmission line such as may be caused by snow. The integrators may be chemical integrators similar to those manufactured by Self-Organizing Systems, Inc.

Figure 4:
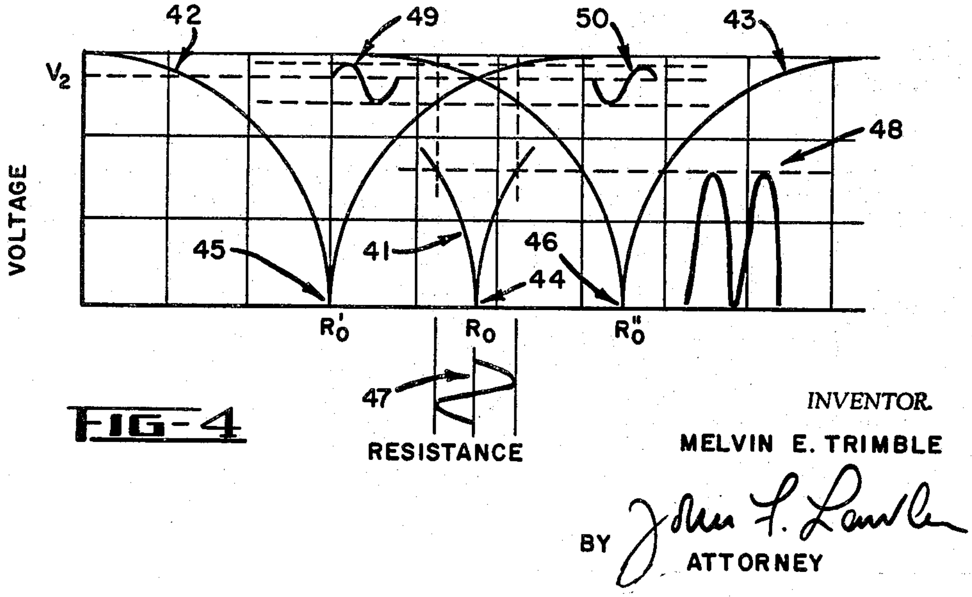

The operation of the impedance control circuits is illustrated by the waveforms of FIGURES 3 and 4. Referring to FIGURE 3, waveform 41 represents the response characteristic of the transmission lines as a function of the resistance of variable resistor 37 when there is no snow under the transmission lines. More particularly, waveform 41 represents a plot of the operating point of detector 31 as variable resistor 37 is varied through its range of values. When the transmission lines are balanced with respect to each other such that there is no reflected signal from the transmission lines and there is no output from hybrid 10, variable resistor 37 has the nominal resistance $R_0$ indicated at 44. When the resistance of the variable resistor 37 is increased to the value $R_1$ or decreased to the value $R_2$, the voltage about which detector 31 operates increases to the voltage $V_1$.

When snow builds up under different positions on a transmission line and the resistance of variable resistor 37 is maintained constant at the nominal value $R_0$, the value of the resistive component of the effective characteristic impedance of the transmission line changes, a signal is reflected on the transmission line and the operating point of detector 31 increases to the voltage $V_2$. Waveform 42 represents a plot of the operating point of detector 31 as a function of the resistance of the variable resistor 37 when snow is located under certain positions on the transmission lines. The waveform 43 represents a plot of the operating point of detector 31 as a function of the resistance of the variable resistor 37 when snow is located under different positions on the transmission lines. Reference to waveform 42 reveals that when snow builds up under certain positions on the transmission line it is necessary to reduce the value of the variable resistor 37 from the nominal resistance $R_0$ to the nominal resistance $R_0'$ indicated at 45 in order to again balance the transmission lines. Reference to the waveform 43, however, reveals that when snow builds up under other positions on the transmission line it is necessary to increase the resistance of variable resistor 37 from the nominal resistance $R_0$ to the nominal resistance $R_0''$ indicated at 46 in order to again balance the transmission lines. Modulation of the variable resistor 37 is employed to indicate the sense of the change in the resistance of the variable resistor and the resistive component that is required to balance the transmission lines.

When the system is initially turned on, signals reflected on lines 11 and 12 are rectified by detector 31 and pump up integrators 36, 36' which store signals that determine the values of variable impedances 37, 37'. Variable resistor 29 and variable capacitor 30 are adjusted to balance the transmission lines so that variable impedances 37 and 37' have the nominal values $R_0$ (see FIGURE 3) and $C_0$ (not shown), respectively.

Referring to FIGURE 4, when there is no discontinuity on the transmission lines, the resistive component has the nominal value $R_0$. The output 47 of reference oscillator 32 on line 39 modulates the resistance of the variable resistor and thus the resistive component at the 10 Hz. rate. When the modulation signal 47 is zero, the associated reflected signal 48 on line 11 is also zero. When the modulation signal 47 is positive during the first half cycle, the resistance of variable resistor 37 increases causing the associated reflected signal 48 to be positive. When the modulation signal 47 is negative during the second half cycle, the resistance of variable resistor 37 decreases. The associated reflected signal 48, however, is again positive. Thus, the actual reflected signal on line 11 is a 30 mHz. signal from oscillator 6 that is modulated by both the 1 kHz. output of oscillator 7 and the full wave rectified 10 Hz. sine wave (the associated reflected signal 48).

The reflected signal is rectified by detector 31 to reproduce the full wave rectified signal 48 that is applied to synchronous detector 35. The cutoff frequency of the low pass filter associated with detector 31 is much greater than 10 Hz. in order to pass a number of the frequency components comprising the full wave rectified signal 48. During the first half cycle, the reference signal 47 on line 38 and the rectified signal 48 on line 34 are in phase and the output of detector 35 is a negative signal whose magnitude is equal to the magnitude of the rectified signal 48 (see Table 1, row *a*). These signals are 180 degrees out of phase during the second half cycle, however, and the output of detector 35 is a positive signal whose magnitude is equal to the magnitude of the rectified signal 48 (see Table 1, row *c*). The effective value of the output of detector 35 is therefore zero and the output of integrator 36 does not change the effective value of variable resistor 37. Thus, the nominal resistance $R_0$ of the transmission line characteristic impedance is constant when the system is balanced.

Consider that snow build up under a transmission line unbalances the transmission lines such that the nominal value of variable resistor 37 that is required to balance the transmission line decreases from the value $R_0$ to the value $R_0'$ indicated at 45 and the response of the transmission lines to changes of the value of the variable resistor is represented by the waveform 42. Consider also that the actual resistance of variable resistor 37 is still the value $R_0$ so that the operating point of detector 31 is the voltage $V_2$. When the modulation signal 47 from oscillator 32 goes positive during the first half cycle, the resistance of variable resistor 37 increases causing the associated reflected signal 49 on line 11 to be positive. When the modulation signal 47 is negative during the second half cycle, the resistance of the variable resistor decreases causing the associated reflected signal 49 to also be negative. Since the rectified reflected signal 49 on line 34 and the modulation signal 47 on line 38 are in phase, the output of synchronous detector 35 is a negative voltage (see Table 1, row *a*). The negative output of synchronous detector 35 is summed by integrator 36 and causes the resistance of variable resistor 37 to decrease to the value $R_0'$ required to again balance the transmission lines.

Conversely, consider that snow build up under a transmission line unbalances the transmission lines such that the value of variable resistor 37 required to balance the transmission lines increases from the value $R_0$ to the value $R_0''$ indicated at 46 and the response of the transmission lines to changes of the resistance of the variable resistor is represented by waveform 43. Consider also that the resistance of variable resistor 37 is still $R_0$ so that the operating point of detector 31 is the voltage $V_2$. Reference to FIGURE 4 reveals that variations of the modulation signal indicated at 47 and the associated reflected signal indicated at 50 are 180 degrees out of phase. Thus, the output of synchronous detector 35 is a positive voltage (Table 1, row *c*) that is summed by integrator 36 and causes the resistance of variable resistor 37 to increase to the value $R_0''$ required to again balance the transmission lines.

Comparison circuit 33' operates in a similar manner to bias variable capacitor 37' to have the necessary value to balance reactive components of the transmission lines.

It is seen from the above description that the impedance control circuit of this invention detects the magnitude and sense of slow changes in both the resistive and reactive components of the characteristic impedances of the transmission lines and automatically changes the values of the variable resistive and reactive elements to balance the transmission lines. Since the integrators 36, 36' have very long time constants, impedance control circuit 27 does not compensate for impedance changes caused by slowly moving intruders and therefore does not compromise the detection capabilities of the system.

From the above detailed description of a preferred embodiment of this invention, various modifications will be apparent to those skilled in the art. The scope and breadth of this invention is, therefore, to be determined from the following claims rather than from the above detailed description.

What is claimed is:

1. In an intruder detection system including a two-wire transmission line bounding an area to be protected and a first detector circuit responsive to signals on the transmission line for detecting and indicating intrusion of the protected area, an impedance control circuit comprising:

a second detector circuit having an input connected to the transmission line and having an output, said second detector circuit rectifying signals on the transmission line, an oscillator having an output, variable impedance means having an output connected to the transmission line, having a first input connected to the output of said oscillator for modulating the value of said variable impedance means and the value of the transmission line characteristic impedance, and having a second input, means for detecting the output of said second detector as a function of the output of said oscillator, and means for summing the output of said detecting means, said summing means having an output connected to the second input to said variable impedance means for varying the effective value thereof and the effective value of the transmission line characteristic impedance.

2. The system according to claim 1 wherein said variable impedance means comprises a variable resistor.

3. The system according to claim 1 wherein said variable impedance means comprises a variable reactance.

4. The system according to claim 1 wherein said variable impedance means comprises a variable capacitor.

5. An intruder detection system comprising:

a transmitter having an output, said transmitter generating radio frequency signals, a two-wire transmission line bounding an area to be protected, a signal branching circuit having a first terminal connected to the output of said transmitter, having a second terminal connected to said transmission line and having third and fourth terminals, a ne twork having an impedance substantially equal to the characteristic impedance of said transmission line and having a terminal connected to said third terminal, a first detector circuit having an input connected to said fourth terminal, said first detector circuit being responsive to radio frequency signals on said transmission line for detecting and indicating intrusion of the protected area, a oscillator having an output, said oscillator generating a radio frequency signal having a frequency much less than the frequency of the output of said transmitter, a second detector circuit having an input connected to said fourth terminal, said second detector rectifying signals on said transmission line and passing signals having frequencies that are closely related harmonics of the frequency of said oscillator, a variable impedance element having an output connected to the transmission line, having a first input connected to the output of said oscillator for varying the value of said impedance element and the value of the transmission line characteristic impedance at the frequency of oscillation of said oscillator, and having a second input, a synchronous phase detector having a first input connected to the output of said second detector circuit and having a second input connected to the output of said oscillator and having an output, and an integrator for summing the output of said synchronous detector, said integrator having a long time constant and having an output connected to the second input to said impedance element for varying the effective value thereof and the effective value of the transmission line characteristic impedance for balancing the system for compensating for slow changes in the value of the characteristic impedance.

6. The system according to claim 5 wherein said variable impedance element is a variable resistor.

7. The system according to claim 5 wherein said variable impedance element is a variable reactance.

8. The system according to claim 5 wherein said variable impedance element is a variable capacitor.

9. The system according to claim 5 wherein said network comprises a two-wire transmission line.

10. An intruder detection system comprising:

a transmitter for generating radio frequency signals, first and second two-wire transmission lines bounding an area to be protected, a signal branching network having a first terminal connected to one end of said first transmission line, having a second terminal connected to one end of said second transmission line, having a third terminal connected to an output of said transmitter and having a fourth terminal, a first detector circuit having an input connected to said fourth terminal, said first detector circuit being responsive to signals reflected on said transmission lines for detecting and indicating intrusion of the protected area, a radio frequency oscillator generating first and second outputs differing in phase by 90 degrees, the frequency of oscillation of said first and second outputs being less than the frequency of oscillation of the output of said transmitter, a second detector circuit having an input connected to said fourth terminal and having an output, said second detector circuit rectifying and passing signals having frequencies that are closely related harmonics of the frequency of said oscillator, a first comparison circuit comprising:

a first variable resistor having an output connected to one of said transmission lines, having a first input connected to the first output of said oscillator for modulating the resistance of the variable resistor and the value of the resistive component of the transmission line characteristic impedance at the frequency of oscillation of said oscillator and having a second input, a first synchronous phase detector having a first input connected to the first output of said oscillator, having a second input connected to the output of said second detector circuit and having an output, said first synchronous detector generating an output proportional to the difference in phase between the inputs thereto, and a first integrator for summing the output of said first synchronous detector, said first integrator having a long time constant and having an output connected to the second input to said first variable resistor for varying the effective resistance thereof and the effective value of the resistive component of the characteristic impedance for resistively balancing the system for compensating for slow changes in the characteristic impedance, and a second comparison circuit comprising a variable reactive element having an output connected to said one transmission line, having a first input connected to the second output of said oscillator for modulating the reactance of said variable reactive element and the value of the reactive component of the characteristic impedance and having a second input, a second synchronous phase detector having a first input connected to the second output of said oscillator and having a second input connected to the output of said second detector circuit and having an output, said second synchronous detector generating an output proportional to the difference in phase between the inputs thereto, and a second integrator for summing the output of said second synchronous detector, said second integrator having a long time constant and having an output connected to the second input to said variable reactive element for varying the effective value of the reactance thereof and the effective value of the reactive component of the characteristic impedance for reactively balancing the system for compensating for slow changes in the characteristic impedance.

11. The system according to claim 10 wherein said variable reactive element comprises a variable capacitor.

12. An intruder detection system comprising:

a transmitter for generating radio frequency signals, first and second two-wire transmission lines bounding an area to be protected and having substantially equal characteristic impedances, first and second terminations connected between the wires of said first and second transmission lines, respectively, at one end thereof, said terminations having impedances substantially equal to the associated characteristic impedances, a signal branching network having a first terminal connected to the other end of said first transmission line, having a second terminal connected to the other end of said second transmission line, having a third terminal connected to an output of said transmitter and having a fourth terminal, a first detector circuit having a first input connected to said fourth terminal and having a second input connected to an output of said transmitter, said first detector circuit synchronously detecting signals reflected on said transmission lines as a function of an output of said transmitter for detecting and indicating intrusion of the protected area, a radio frequency oscillator generating a first output and a second output leading said first output by 90 degrees, the frequency of oscillation of said first and second outputs being less than the frequency of oscillation of said transmitter, a second detector circuit having an input connected to said fourth terminal and having an output, said second detector circuit rectifying and passing signals having frequencies that are closely related harmonics of the frequency of said oscillator, a first comparison circuit comprising:

a first variable resistor having an output connected to said first transmission line, having a first input connected to the first output of said oscillator for modulating the resistance of the variable resistor and the value of the resistive component of the characteristic impedance at the frequency of oscillation of said oscillator, and having a second input, a first synchronous phase detector having a first input connected to the first output of said oscillator, having a second input connected to the output of said second detector circuit and having an output, said first synchronous detector generating an output proportional to the difference in phase between the inputs thereto, and a first integrator for summing the output of said first synchronous detector, said first integrator having a long time constant and having an output connected to the second input to said first variable resistor for varying the effective resistance thereof and the effective value of the resistive component of the characteristic impedance for resistively balancing the system for compensating for slow changes in the characteristic impedance, a second comparison circuit comprising:

a first variable capacitor having an output connected to said first transmission line, having a first input connected to the second output of said oscillator for modulating the capacitance and reactance of said first variable capacitor and the value of the reactive component of the characteristic impedance and having a second input, a second synchronous phase detector having a first input connected to the second output of said oscillator and having a second input connected to the output of said second detector circuit and having an output, said second synchronous detector generating an output proportional to the difference in phase between the inputs thereto, and a second integrator for summing the output of said second synchronous detector, said second integrator having a long time constant and having an output connected to the second input to said first variable capacitor for varying the effective value of the capacitance and reactance thereof and the effective value of the reactive component of the characteristic impedance for reactively balancing the transmission lines for compensating for slow changes in the characteristic impedance, a second variable resistor having one terminal connected to said second transmission line and having a second terminal connected to a reference potential, and a second variable capacitor having a first terminal connected to said second transmission line and having a second terminal connected to the reference potential, said second variable resistor and capacitor being adjustable for initially balancing the system.

No references cited.

JOHN W. CALDWELL, *Primary Examiner.*

D. L. TRAFTON, *Assistant Examiner.*